INVENTOR
MAX J. BALKOW
MICHAEL J. FRANK

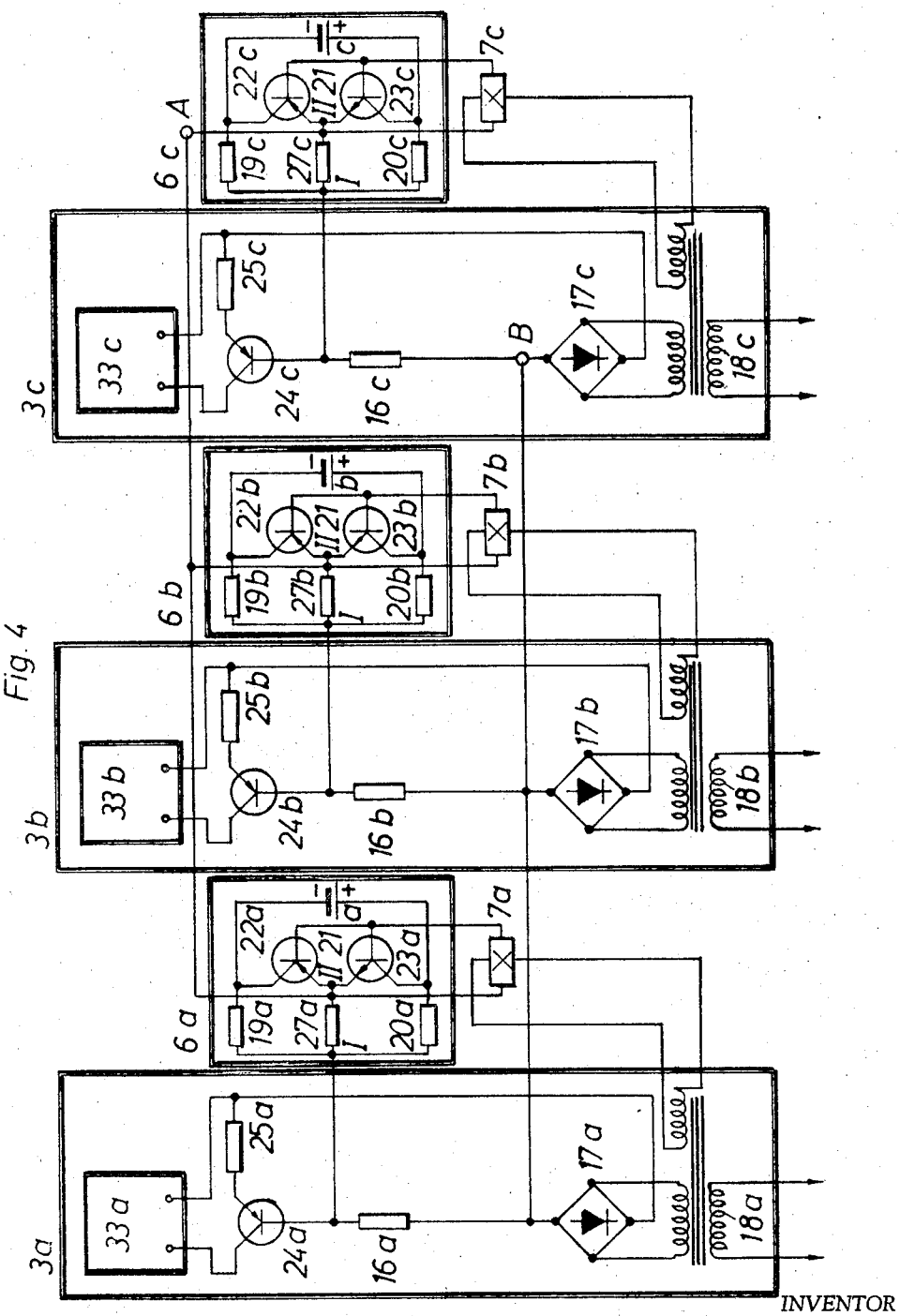

United States Patent Office 3,405,282
Patented Oct. 8, 1968

3,405,282
REGULATING CIRCUIT FOR THE EQUAL
LOAD DISTRIBUTION
Max J. Balkow, Feucht, and Michael J. Frank, Altenfurt, Nurnberg, Germany, assignors to International Standard Electric Corporation, New York, N.Y., a corporation of Delaware
Filed Nov. 4, 1964, Ser. No. 408,965
Claims priority, application Germany, Nov. 8, 1963, ST 21,296
4 Claims. (Cl. 307—57)

ABSTRACT OF THE DISCLOSURE

The voltages and currents of parallel operated motors and generators are applied to Hall effect devices producing Hall voltage signals of respective polarities indicative of the type of correction necessary to effect equalization of the power dissipated or generated. The Hall voltages via direction-dependent amplifiers appropriately modify the machine speeds through control governors by changing the excitation field to produce the said equalization.

Figure 1:
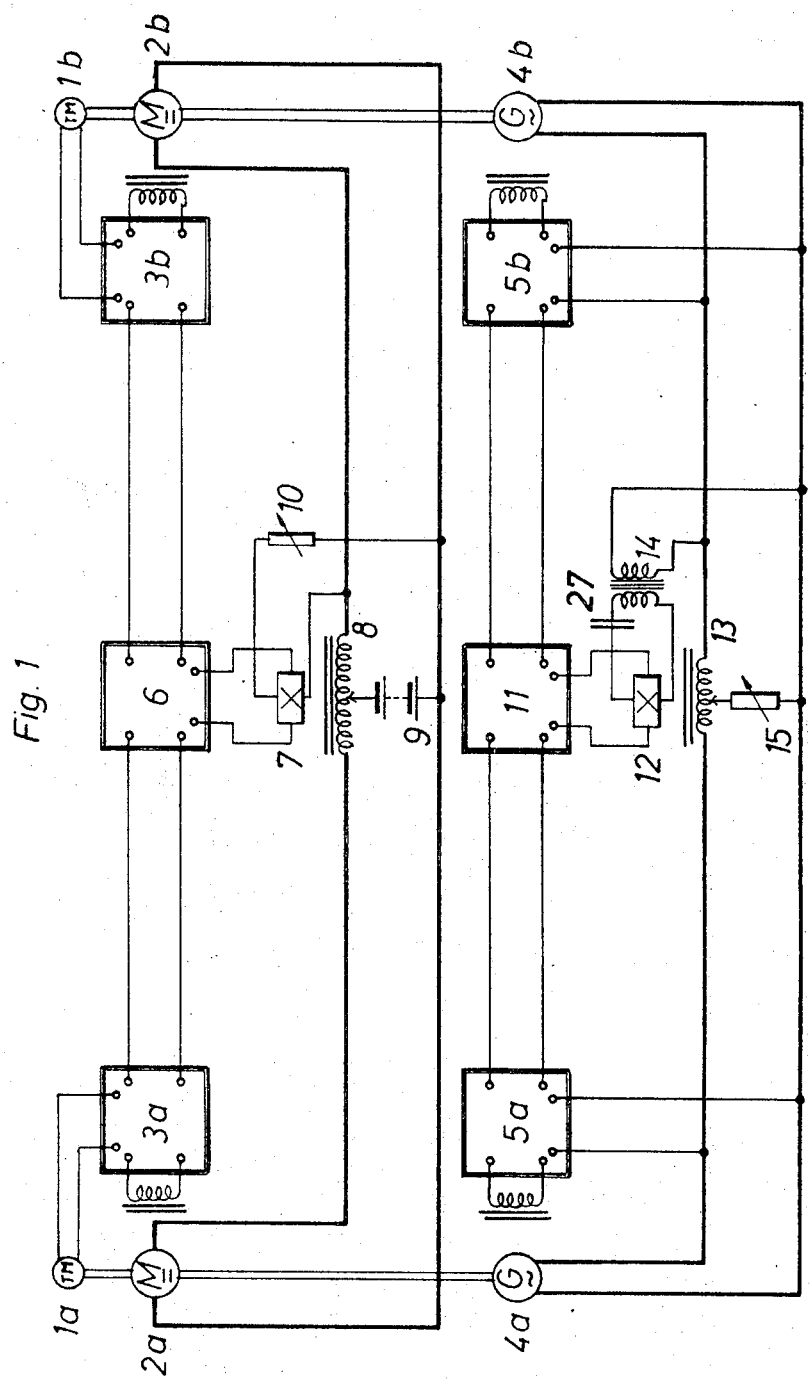

The present invention relates to an equal load distributing circuit for regulating motors and/or generators, as well as converters (transformers).

Difficulties arise in the parallel connection of motors, generators, or converters consisting of a direct current driving motor and of an alternating current synchronizing generator, as soon as these machines are being regulated to a constant speed, or to a constant generator voltage respectively. The equal load regulation in the case of motors is mostly carried out in such a way that the speed of the individual motors is measured, and compared with a nominal value, and is thus kept at an equal value with respect to all of the parallel-connected machines. The equal distribution of the reactive power in the case of generators is mostly carried out by changing the exciting field of the individual generators. In the case of converters which are composed of a D.C. motor and of an A.C. generator the distribution of the effective power to the individual machines is also carried out by regulating the speed of the driving machine. If the generators which are to be regulated to a constant voltage, are connected in parallel, slight deviations in the field excitations may be the cause of equalizing currents between these machines. For example, one generator may deliver an inductive reactive power, and the other generator may receive this power. These circulating currents then continuously increase until the machines are overloaded.

It is known to influence the voltage regulators of the generators in dependence upon these equalizing currents in such a way that the equalizing currents will remain within bearable limits. To this end the conventional types of circuit arrangements employ choke coils and magnetic amplifiers. The expenditure on the conventional types of circuit arrangements, however, is very high, and in addition thereto the weight of the components used for the regulating purpose, due to the employment of choke coils and magnetic amplifiers, is a relatively high one. The aforementioned components also have a time constant which may not be neglected.

The disadvantages of the conventional types of circuit arrangements serving the equal load distributing purpose, are avoided by the present invention.

The circuit arrangement for the equal load regulation of motors and/or generators according to the invention is characterized by the fact that a Hall generator is acted upon by the current as well as by the voltage of the motors or generators respectively. Via direction-dependent amplifiers the Hall voltage is used for the readjusting purpose.

The Hall generator is a thin wafer component of semiconductor material whose output voltage is proportional to a product. The well-known equation for the Hall generator reads as follows:

$$U_H \sim k \cdot B \cdot i$$

Here, $U_H$ is the Hall voltage, B is the magnetic induction, $i$ is the control current, and $k$ represents a constant.

Since the induction in an iron circuit is proportional to the exciting current, the Hall generator can be used via the induction, for the current measuring purpose.

Another measuring quantity is the voltage applied to the Hall generator. When feeding to a Hall generator the motor current as the exciting current, via the induction, and when applying the motor voltage to the Hall generator, then the produced Hall voltage will be in proportion to the product of motor current and motor voltage.

However, since in the case of the generator, the exciting field of the Hall generator is shifted by 90° with respect to the control current, the mean value of the Hall voltage in the case of alternating current is proportional to the reactive power. The direction of the Hall voltage is likewise dependent upon the kind of reactive power. Thus, for example, an inductive reactive power results in a medium positive Hall voltage, and a capacitive reactive power results in a negative Hall voltage.

Since the Hall voltage is thus in proportion to the power of the thus connected motor or generator respectively, and since in addition thereto, the direction of the Hall voltage may change, it is possible in this way to compare two or more powers with one another, and to utilize the produced Hall voltage for the equal load distributing purpose.

In cases where the Hall voltage is used for readjusting individual parallel-connected motors or generators, it is advantageous to insert a direction-dependent amplifier between the Hall generator and the regulator. Via this amplifier it is then possible, in dependence upon the direction of the Hall voltage, to readjust the one or the other motor or generator.

The invention as well as further embodiments thereof will be better understood from the following description made with reference to the accompanying drawings:

In FIG. 1 there is shown a circuit arrangement for the equal load regulation of two converters from one D.C. motor, and one alternating current generator.

Figure 2:
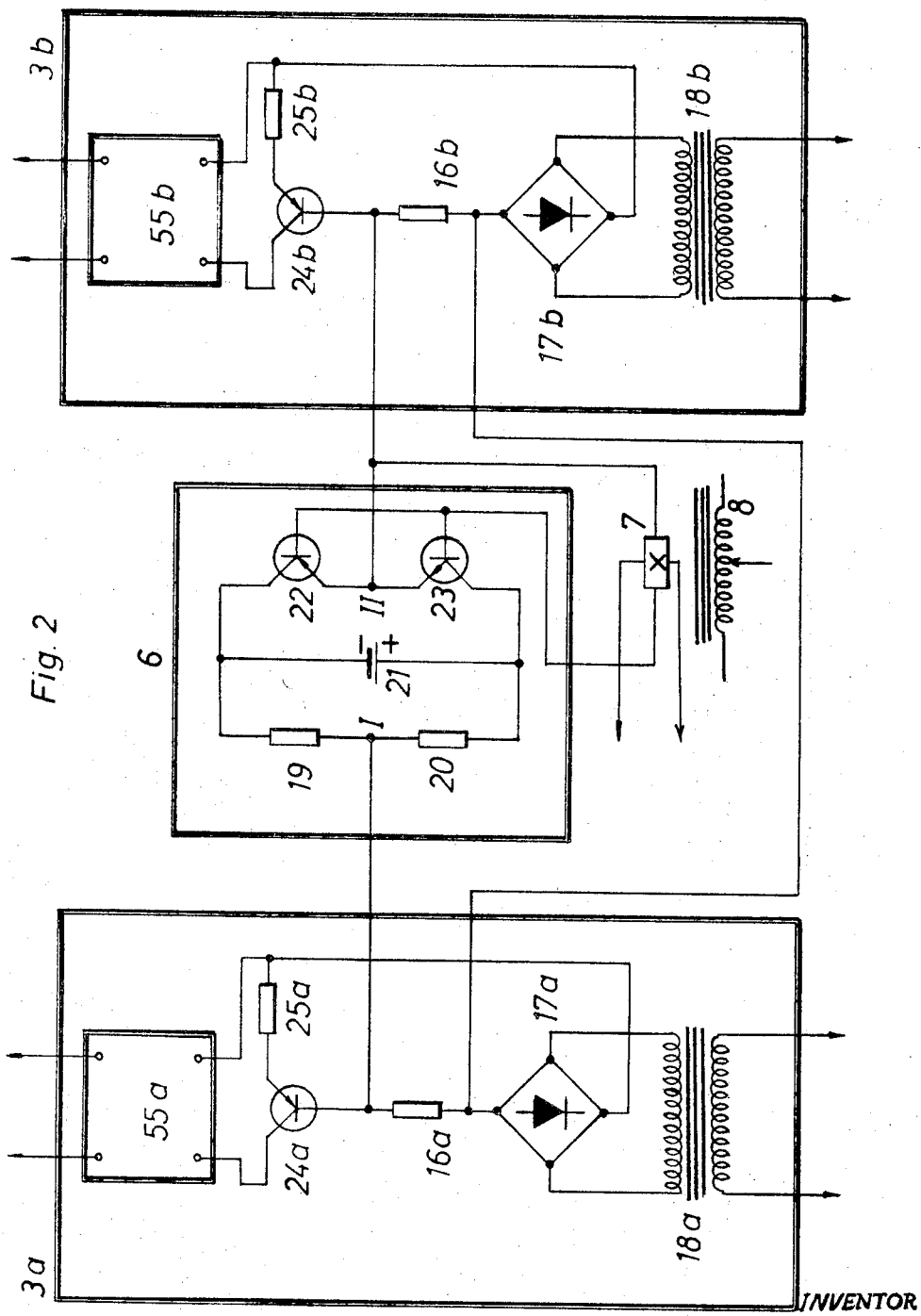

FIG. 2 shows the circuit arrangement of the direction-dependent amplifier, via which the Hall voltage is used for regulating the individual machines.

Figure 3:
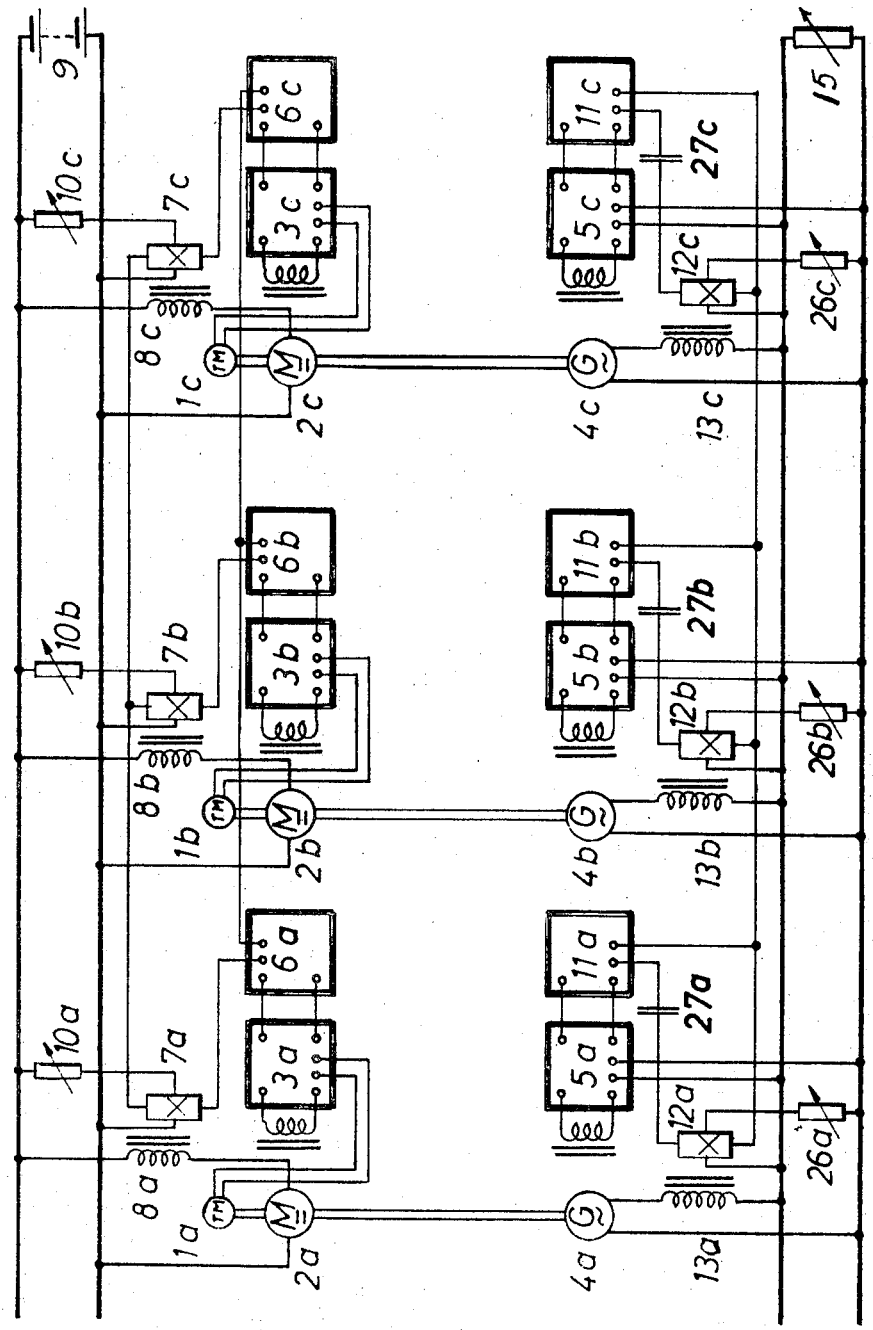

In FIG. 3 there is shown a circuit arrangement in which several parallel-connected converters are regulated to the same load with the aid of Hall generators.

In FIG. 4 there is shown the circuit arrangement of the direction-dependent amplifiers for the parallel connection of several converters according to FIG. 3.

The converters in the circuit arrangement according to FIG. 1 consist each of a D.C. motor 2a and 2b and of an A.C. generator 4a and 4b coupled thereto. Usually the equal-load regulation of the parallel-connected converters is carried out in such a way that the D.C. motors are provided with tachometer machines 1a and 1b whose volttage represents a measurement for the number of rotations of the respective motor. The voltage of the tachometer machines is fed to a speed governor 3a and 3b in that the voltage of the tachometer is compared with a constant voltage, and in that the field of the associated motor is affected by the difference. In many cases, however, this regulation is insufficient for the equal load regulating purpose and, in addition thereto, does not prevent the flowing of equalizing currents.

According to the present invention a Hall governor 7 is used in addition for effecting the equal-load regulation. The exciting core 8 of the Hall generator is traversed by the motor currents. Reference numeral 9 indicates the source of current for the two motors 2a and 2b. The induction as produced in the exciting core 8 of the Hall generator 7 is in proportion to the exciting current. To the control circuit of the Hall generator, and via the variable resistor 10, there is simultaneously applied the motor voltage.

Since the exciting core 8 of the Hall generator 7 comprises one winding with a centre tapping, the excitations of the two motor currents annul each other when being equal. Only in cases where the motor currents are of different magnitude, a Hall voltage is produced in the Hall generator 7. This Hall voltage is proportional to the power difference of the two motors. The Hall voltage as produced by the Hall generator 7 is amplified in a suitable way, and is fed to the direction-dependent amplifier 6. Quite depending on the direction of the Hall voltage, and via the the direction-dependent amplifier 6, there is affected either the governor 3a of the motor 2a, or the governor 3b of the motor 2b, and is readjusted to such an extent that the motor currents will become equal, and a Hall voltage is no longer produced in the Hall generator 7. In the course of the regulation, the governors act upon the field excitation of the motors in such a way that the motor with the lower power input is somewhat underexcited, so that it will run quicker. Since all elements are amplifiers acting proportionally, a slight control deviation will remain to exist. The magnitude of this deviation is dependent upon the dimensioning of the exciting core 8 of the Hall generator, and on the subsequently arranged amplifiers.

In a similar way there is effected the regulation of the generators 4a and 4b. The generators are connected in parallel, and feed the load 15 in common. The exciting core 13 of the Hall generator 12 comprises a winding with a centre tapping to which the two generators are connected in such a way that in the case of an equal output current, the effects of the two currents will annul each other. If both generators supply the same reactive power when the sum of the excitation in the core equals zero. Via a matching transformer 14 the generator voltage of the two generators is fed to the Hall generator 12.

In this circuit there is still required a phase shifter arrangement which is symbolized in the drawing by the capacitor 27. Of course, it is also possible to use, instead of the capacitor, the conventional types of circuit arrangements for producing a phase shift. For example, if the generator 4b delivers an inductive reactive power to the generator 4a, then a magnetic field will be produced in the core 13, and the Hall generator 12 will provide a Hall voltage which then will be in proportion to the difference of the reactive power. The Hall voltage is reamplified and, via the direction-dependent amplifier 11, there is acted upon either the governor 5a or 5b of the two generators 4a and 4b, i.e. quite depending on the direction of the Hall voltage.

In FIG. 2 the circuit arrangement for the direction-dependent amplifier is shown in greater detail. This amplifier substantially consists of a bridge circuit comprising the resistors 19 and 20, and the two complementary transistors 22 and 23. The transistor 23 is e.g. of the npn type, and the transistor 22 is of the pnp type. The Hall voltage of the Hall generator 7 is fed to the base-emitter circuit of these two transistors.

To the one diagonal branch of the bridge circuit there is connected the auxiliary source of current 21, and to the other diagonal branch there are connected the two governors 3a and 3b. In FIG. 2 these governors consist of the parts 55a and 55b, and of the transistor circuit comprising the elements 24a, 25a, 16a, 17a and 18a or 24b, 25b, 16b, 17b, 18b, respectively. Parts 55a and 55b are simply terminal boxes which connect governors 3a and 3b, respectively, to the field windings of motors 2a and 2b, respectively. If point II is positive, then the transistor 22 is driven into saturation. The bridge circuit then will be negative in point II. If the Hall voltage has the opposite sign, so that the negative pole is applied to point II, then the transistor 23 is driven into saturation, and the positive bridge voltage will be applied to point II. The bridge diagonal I–II is connected to the base electrode of the transistors 24a and 24b; at the same time the base resistor 16a and 16b is applied to the base electrode.

The ends of these two resistors 16a and 16b which are not connected to the base electrode, are joined to one another. On account of this a current is permitted to flow from the bridge, via the resistor 16b, to the resistor 16a and back to the bridge, when the voltage at the Hall generator is so directed that it is negative at point II. In the other case, when the Hall voltage at point II is positive, a current will flow in the opposite direction via the resistor 16a, to the resistor 16b, and back to the bridge. In this way a voltage is once added or subtracted in the base circuit of the transistor 24a, an analogously the same is also effected in the base circuit of the transistor 24b. Via the transformers 18a and 18b, the governors are connected to the tachometer machines.

A transformer is necessary in order that the connecting lead between the resistors 16a and 16b can be inserted after the auxiliary rectifier 17a and 17b. This circuit arrangement for the generator regulation is the same. In this case the output terminals of the generators are connected to 18a and 18b.

If several motors or generators are to be operated in parallel, the circuit arrangement will have to be modified accordingly. In FIG. 3 there is shown the circuit scheme for the parallel connection of three converters with each comprising one D-C motor and one A-C generator. The difference over the circuit arrangement according to FIG. 1 resides in the fact that each motor is associated with a Hall generator 7a, b, c or 12a, b, c respectively. The Hall voltage is produced by these Hall generators is fed each time to one direction-dependent amplifier 6a, b, c or 11a, b, c respectively, which, via the associated governor, acts upon the motor or generator respectively. In this case the individual Hall generators are assembled in a unipolar fashion in a starpoint manner, and likewise the individual direction-dependent amplifiers. It is obvious that with the aid of this circuit arrangement it is possible to regulate any arbitrary number of motors, generators, or converters (transformers) to an equal load level.

FIG. 4 shows the corresponding circuit arrangement for the parallel connection of several motors or generators serving the direction-dependent amplifier. For the bridge circuit, similar as in the circuit arrangement according to FIG. 2, there are used each time two resistors and two complementary transistors. The points II of the individual bridge circuits are assembled among each other in a star point manner. The point I is in each case associated with the transistor 24. The resistors 16, as in the circuit arrangement according to FIG. 2, are connected among each other. If the power output of the machines is equal then also the Hall voltages of the individual Hall generators are equal, so that there is not effected any influence upon the individual governors 3. Only if one generator deviates in its reactive power, the associated Hall voltage will predominate, and will act upon the individual generators in such a way that the reactive power will be equally divided. In order to avoid any interferences when both the transistors 22 and 23 of a bridge circuit are blocked, the bridges are by-passed by the resistors 27.

Parts 33a, 33b, and 33c are simply terminal boxes for supplying outputs of governors 3a, 3b, and 3c to the field windings of motors 2a, 2b, and 2c, respectively.

The circuit arrangement may be extended at will, in which case the direction-dependent circuit element of the next generator will have to be connected at points A and B.

In accordance with the foregoing, in FIGS. 1 and 2 amplifiers 6 and 11 act as balancing amplifiers. Rebalancing amplifier 6 is responsive to the output control voltage of the Hall device 7 and varies the input to governor 3a inversely with the difference (P1–P2), where P1 is the power output to motor 2a, and P2 is the power input to motor 2b. Bebalancing amplifier 6 also varies the input to governor 3b inversely with the difference (P2–P1).

Similarly, rebalancing amplifier 11 is responsive to the output control voltage of the Hall device 12. Rebalancing amplifier 11 varies the input to governor 5a inversely with the difference (P3–P4), where P3 is the power output of generator 4a, and P4 is the power output of generator 4b. Rebalancing amplifier 11 also varies the input to governor 5b inversely with the difference (P4–P3).

In FIG. 4, the common connections of rebalancing amplifiers 6a, 6b, and 6c at terminals A and B make it possible to produce an output at governor 3a to control the field windings of motor 2a inversely with the difference between the power input to motor 2a and the mean sum of the power inputs to motors 2b and 2c. Thus, the mean power input of motors 2b and 2c provides a basis for control which is equivalent to the power input to the single additional motor 2b in FIGS. 1 and 2. Rebalancing amplifiers 6b, 6c, 11a, 11b, and 11c provide similar controls. For example, rebalancing amplifier 11b controls governor 5b in a manner such that the excitation voltage supplied to the field windings of generator 4b is varied inversely with the difference between the output power of generator 4b and the mean sum of the output power of generators 4a and 4c.

While we have described above the principles of our invention in connection with specific apparatus, it is to be clearly understood that this description is made only by way of example and not as a limitation to the scope of our invention as set forth in the objects thereof and in the accompanying claims.

What we claim is:

1. In a power balancing system, the combination comprising: source means for supplying electric power; at least first and second electric motors connected in parallel across said source means, each of said motors having a field winding; at least a first Hall device having a first voltage input circuit connected in parallel with said motors and a first inductive winding connected in series with said motors, said first Hall device producing a first output control voltage proportional to the difference between the power inputs to said motors; a first governor for each motor field winding; a first rebalancing amplifier responsive to said first control voltage for varying the input to said first motor governor inversely with the difference (P1–P2), where P1 is said first motor power and P2 is said second motor power, said first amplifier also varying the input to said second motor governor inversely with the difference (P1–P2); at least first and second generators connected in parallel, each of said generators having a field winding; at least a second Hall device having a second voltage input circuit connected in parallel with said generators and a second inductive winding connected in series with said generators, said second Hall device producing a second output control voltage proportional to the difference between the power outputs of said generators; a second governor for each generator to supply a different corresponding excitation voltage to each said generator field winding; and a second rebalancing amplifier responsive to said second control voltage for varying the input to said first generator governor inversely with the difference (P3–P4) where P3 is said first generator power and P4 is said second generator power, said second amplifier also varying the input to said second generator governor inversely with the difference (P4–P3), said first and second electric motors having first and second movable output members respectively, said first and second output members being fixed respectively to said first and second generators to drive the same.

2. The invention as defined in claim 1, wherein said first inductive winding has a center tap and a circuit therefor including a source of potential connected between the center tap of said inductive winding and one pair of input leads to said motors opposite those to which said first inductive winding is connected, said second inductive winding having a center tap and a circuit therefor including a load impedance connected between the center tap of said second inductive winding and one pair of output leads of said generators opposite those to which said second inductive winding is connected.

3. The invention as defined in claim 1, wherein a Hall device is provided for each motor and generator, said first amplifier subtracting the power inputs to said motors, said second amplifier subtracting the power outputs of said generators.

4. The invention as defined in claim 3, wherein each said Hall device includes an inductive input winding in series with a corresponding motor and generator, and a voltage sensing circuit connected in parallel with corresponding motors and generators.

References Cited

UNITED STATES PATENTS

| 2,928,048 | 3/1960 | Postal | 324—99 |
| 2,972,058 | 2/1961 | Kahle | 307—57 |
| 2,986,647 | 5/1961 | Britten | 307—57 |
| 2,993,172 | 7/1961 | Karlicek | 307—57 |
| 3,226,631 | 12/1965 | Kuhrt | 324—45 |

FOREIGN PATENTS 671,198  4/1952  England.

ORIS L. RADER, *Primary Examiner.*

W. E. DUNCANSON, *Assistant Examiner.*